Patented Nov. 16, 1948

UNITED STATES PATENT OFFICE 2,454,019

2,454,019

PURIFICATION OF HETEROCYCLIC NITROGEN COMPOUNDS

John Wesley Waldron, Muncie, Ind., assignor to Allied Chemical & Dye Corporation, New York, N. Y., a corporation of New York No Drawing. Application January 27, 1943, Serial No. 473,758

7 Claims. (Cl. 260—290)

This invention relates to purification of heterocyclic nitrogen base crudes of unstable color and undesirable odor, particularly pyridine and picoline crudes.

Crude heterocyclic nitrogen bases such as pyridine and its homologs, and mixtures thereof with pyrrole, recovered, for example, from coke oven distillates or other sources, may contain impurities which give an undesirable odor or color to the crude, or which tend to form undesirable odor or color in the crude upon aging. In some cases, such impurities may be removed by careful fractionation of the crude and removal of pyrrole. There is a class of heterocyclic nitrogen crudes, however, of such a nature that even after careful distillation and removal of pyrrole the bases have an undesirable odor or tend to form color upon standing. No process has heretofore been available for permanently decolorizing and improving the odor of these crudes. Such crudes accordingly have had little industrial value. Color-stable nitrogen compounds, on the other hand, are of considerable industrial value; mixtures of nitrogen bases, for example, find increasing use as special solvents, while the individual bases are suitable, for example, for preparation of various pharmaceuticals, agricultural chemicals, and vitamin products.

It is an object of this invention to provide a new process whereby heterocyclic nitrogen compound crudes of poor odor or unstable color are improved in odor and color stability.

It is a particular object of this invention to provide a process for treating that class of nitrogen compound crudes having undesirable odor or lacking color stability upon aging, particularly pyridine and picoline crudes, which may contain pyrrole, so as to produce a product of good color stability and improved odor having greatly increased industrial value.

I have discovered that heterocyclic nitrogen compound crudes, particularly pyridine and picoline crudes, which may contain pyrrole, of undesirable odor and poor color stability may be converted into products of substantially improved odor and color stability by refluxing the crudes with aqueous caustic alkali solution. In such a refluxing operation, the mixture of nitrogen base crude and caustic solution is maintained in a boiling condition, and the effluent vapor of the heterocyclic nitrogen base or bases, and most of the water vapor, are condensed and returned to the boiling mixture, while the more volatile material, which I have reason to believe may include decomposition products of impurities in the nitrogen base crude tending to give the crude an undesirable odor or to render it unstable in color, partially passes off in vapor form. The boiling of the mixture, with return of reflux condensate, is preferably continued for at least from ½ hour to 5 hours at atmospheric pressure.

As above stated, the process of the invention is applicable particularly to pyridine and picoline crudes of poor color stability. By pyridine or picoline crude is meant a crude that contains sufficient pyridine or picoline to make the separation thereof economically attractive. This generally means about 40% or more pyridine or picoline, but under unusual economic conditions may mean as low as 2% or 3%.

Crudes of undesirable odor and poor color stability are of such a nature that even after various purification treatments, such as washing and fractional distillation, the nitrogen base or base mixture develops color or undesirable odor upon aging. It is not fully understod exactly what impurities or what characteristics of a nitrogen base crude make the crude develop undesirable odor and poor color upon aging. I have found, however, that the following test may be helpful to determine whether or not a particular nitrogen base crude is of the type to which the process of the invention is applicable:

The pyridine or picoline crude is first treated to remove pyrrole, if present. This may be done, for example, by the zinc chloride method described in copending application Serial No. 463,736, filed October 29, 1942, now patent No. 2,421,413, dated June 3, 1947. The crude is then simple-distilled to remove tar and salts, the distillation being discontinued before the vapor temperature rises above 180C. The distillate is dried over solid caustic soda and submitted to fractional distillation, using a column of about 15–20 theoretical plates. Distillation is carried on until cuts have been taken through the boiling ranges of the principal nitrogen base constituents present in the crude. If one of these distillate cuts has poor color stability initially or on aging for seven days, the process of the invention should be applied.

All crudes shown by this test to be of poor color stability are improved by treatment in accordance with the process of my invention, and most crudes that show poor color stability when thus tested are made completely stable as to color and improved as to odor when treated by the process of my invention. Reference herein to nitrogen base crudes of "poor stability" is intended to denote the crudes which are indicated by this test to have poor color stability.

An example of a source of crude from which pyridine or picoline fractions of poor odor and poor color stability are obtained is the base mixture recovered from coke-oven distillates from high temperature carbonization of coal. However, the process of my invention is not limited to treatment of nitrogen base mixtures from high-temperature carbonization operations, but as above stated is applicable to treatment of nitrogen base crudes, generally, of "poor stability," as indicated by the above test.

Prolonged treatment of such nitrogen base crudes with an aqueous caustic alkali solution at boiling temperature, I have found, alters the nature of the crudes so that with this treatment alone or, in some cases, with this treatment in combination with other simple treatments of the crude as described below, the crudes are substantially improved in odor and color stability upon aging, and in many cases, as above pointed out, are completely stable as to color. While the theory of this action is not fully understood, the improvement seems to result, at least in part, from a slow reaction between the hot alkali solution and the crude nitrogen base whereby some constituents of the crude are decomposed or altered in chemical constitution. As evidence of this, it is noted that ammonia may be given off in substantial amounts during the refluxing with caustic alkali solution, even when the original crude base contains little or no ammonia.

The term "caustic alkali" is used herein to denote caustic soda (NaOH) or caustic potash (KOH). The amount of alkali required depends upon the condition of the crude treated. The amount may be determined by series of tests on the crudes which it is desired to treat by the process of this invention. However, I have found it convenient in plant operation to avoid making numerous test runs on crudes received in the plant by using regularly an amount of caustic that is sure to be in excess of the amount required for any of the crudes regularly received in the plant. For example, in treating nitrogen base crudes by the process of my invention, over a period of time I have found it satisfactory to charge to the still in every case a mixture containing 75% by volume of crude base and 25% by volume of a 28% (by weight) caustic soda solution. The concentration of the aqueous caustic solution may vary throughout a wide range; for example it may be as little as 5% or as high as 50%, provided only that the caustic solution contains the necessary amount of alkali.

In a preferred process of carrying out my invention, a nitrogen base crude is preferably first subjected to simple distillation, particularly when tar-like residual material and salts are present in the crude since such material, I have found, may interfere with subsequent operations. With some crudes, experience may indicate that this initial distillation step may be omitted.

The nitrogen base is then refluxed with an aqueous caustic alkali solution with mechanical agitation, until the nitrogen base in the reflux condensate is clear and colorless, preferably for a period of from ½ hour to 5 hours, as above stated. In the case of water-soluble crudes, such as a pyrrole-free pyridine or picoline fraction, which initially contains water in solution such water may be utilized for production of the aqueous caustic alkali solution; i. e. solid caustic or a concentrated aqueous caustic soda solution may be added to such base whereupon the greater part of the water dissolved in the nitrogen base is taken up by the alkali or alkali solution to form an aqueous alkali solution as a separate phase in the mixture. After the refluxing is completed, the spent alkali solution is removed from the nitrogen base, e. g., by settling and decanting, and the nitrogen base may be dried over solid caustic alkali or concentrated caustic alkali solution. The nitrogen base is then preferably redistilled; in the case of a nitrogen base mixture, fractions of individual bases may be taken in this distillation.

The temperature of the heat treatment with aqueous alkali depends, in general, upon the natural refluxing temperature of the mixture. This refluxing temperature may of course be raised by carrying out the treatment under a pressure above atmospheric; by thus raising the temperature of treatment, the optimum time of refluxing may be somewhat reduced. However, I have found it preferable for reasons of economy to carry out the treatment at atmospheric pressure, whereby the treatment is carried out at the normal refluxing temperature of the mixture, and the refluxing is preferably continued for at least a half hour.

Nitrogen bases or nitrogen base mixtures of improved odor and stable color are thus produced. In order to render pyrrole-containing nitrogen base fractions, which generally boil within the range 130°–150° C., water-soluble and to give them more complete color stability, it is advantageous to remove the pyrrole. This may be done by the zinc chloride method described in copending application Serial No. 463,736, filed October 29, 1942.

The following examples are illustrative of the process of my invention.

*Example 1.*—A crude tar-base mixture of specific gravity 1.006 at 15.5° C. containing 19.2% water and 78.0% pyridine was employed in this run. The base crude distilled as follows:

| Volume per cent Distilled | Temperature, °C. |
|---|---|
| Start | 92.5 |
| 5 cc | 94 |
| 10 cc | 95 |
| 20 cc | 95.5 |
| 30 cc | 96 |
| 40 cc | 98 |
| 50 cc | 104.5 |
| 60 cc | 123 |
| 70 cc | 133.5 |
| 80 cc | 147.5 |
| 90 cc | 188 |
| 95 cc | 208 |
| Dry | 218.5 |

This material was first subjected to a preliminary distillation up to a vapor temperature of 180° C. The distillate was then refluxed and mechanically agitated for 2 hours with sufficient caustic soda of 48% concentration to produce 27% soda with the water contained in the pyridine oil. The charge was cooled and settled, and the spent soda drawn off. After drying over solid caustic soda, the charge was fractionally distilled, fractions being taken from 114° C. to 117° C., from 117 to 128° C., and from 128 to 131° C. These cuts had good odor, and good color and water solubility. The color stability over a period of seven days was good.

*Example 2.*—A crude tar base mixture of specific gravity 1.020 at 15.5° C. containing 10% water, 48% pyridine, and a trace of ammonia, was employed in this run. The base crude distilled as follows:

| Volume per cent Distilled | Temperature, °C. |
|---|---|
| Start | 89 |
| 5 cc | 92 |
| 10 cc | 94.5 |
| 20 cc | 99.5 |
| 30 cc | 108 |
| 40 cc | 124 |
| 50 cc | 137 |
| 60 cc | 145 |
| 70 cc | 158 |
| 80 cc | 182 |
| Dry | 195 |

This material was first subjected to preliminary distillation. 83% of the charge was collected at a temperature up to 190° C., leaving a tar-like residue in the still. This distillate was then refluxed and mechanically agitated for 1½ hours with 25%, by volume, or 28% (by weight) caustic soda solution. Considerable ammonia appeared to be given off during the refluxing period, although the original charge showed only traces of free ammonia. The charge was cooled and settled, and the spent soda was drawn off. Upon fractionation, a pyridine cut distilling from 114° to 117.5° C. and a pyridine-2-picoline fraction distilling from 117.5° to 129° C. were obtained having good color, water-solubility, and good odor. The color stability of these materials was good. By further refluxing with caustic soda solution the cuts distilling below 114° C., and by removing pyrrole from the fractions distilling above 129° C., complete color stability of all the fractions is obtained.

*Example 3.*—The same nitrogen base crude was preliminarily distilled, as described in Example 1, and the distillate was then refluxed and mechanically agitated for a period of 5 hours with 18.7% by volume of the 28% caustic soda solution. The settled oil was then dried over solid soda and fractionated. All of the cuts up to 129° C. had good color, odor, and color stability on aging (one month in daylight). The higher boiling cuts, containing pyrrole, are preferably treated for removal of pyrrole, whereby these cuts are given complete color stability and water-solubility.

As a basis for comparison with Examples 2 and 3, it was attempted to improve the odor and the color stability of the same crude used in these examples by purification treatments other than the method of my invention. Careful fractionation was tried, for example, but was completely unsuccessful—all the cuts obtained turned yellow and had a strong off or foreign odor.

Extraction of the crude base with solutions of caustic soda at room temperature caused some improvement in the color of the distillate on fractionation, but the color stability and odor were poor.

Prolonged refluxing of the nitrogen base crude with aqueous caustic alkali solution, in accordance with the process of my invention, was thus surprisingly found to improve the odor and color stability of the base where other purification treatments had failed.

*Example 4.*—A crude nitrogen base mixture of specific gravity 0.992 at 15.5° C. containing 18% water, 58.7% pyridine, and 0.5 gram NH$_3$ per 100 cc. base, was employed in this run. This crude distilled as follows:

| Volume per cent Distilled | Temperature, °C. |
|---|---|
| Start | 110 |
| 5 cc | 114.5 |
| 10 cc | 115.5 |
| 20 cc | 117.5 |
| 30 cc | 119.5 |
| 40 cc | 120.5 |
| 50 cc | 122 |
| 60 cc | 124 |
| 70 cc | 127 |
| 80 cc | 133 |
| 90 cc | 154 |
| Dry | 170 |

A sample of the above base was subjected to preliminary distillation, as described in Example 1. The distillate was then refluxed and mechanically agitated for ½ hour with 22.5% by volume of the 28% soda solution. The spent soda was drawn off and the settled oil was dried over solid soda and fractionated. Good color, odor, and color stability were obtained on all cuts up to 129° C. Upon removal of pyrrole from cuts above 129° C., complete color stability, water-solubility, and good odor were obtained.

The expression "crude heterocyclic nitrogen base" and similar expressions are used in the claims to denote nitrogen base crudes as above described, namely, liquids which except for a minor proportion of impurities consist substantially entirely of one or more heterocyclic nitrogen bases which may be admixed with heterocyclic nitrogen compounds of the pyrrole type. That is, the word "base" in the quoted expression is used in a collective sense to denote either a single base or a mixture of bases.

Since certain changes may be made in carrying out the above process without departing from the scope of the invention, it is intended that all matter contained in the above description shall be interpreted as illustrative and not in a limiting sense.

I claim:

1. In a process for improving the color stability of a crude heterocyclic nitrogen base of poor stability, said base being free of tar acids, the steps that comprise mixing the crude base with aqueous caustic alkali solution, refluxing the crude base with the caustic alkali solution to purify the base, and then separating the thus purified base from the spent caustic solution.

2. In a process for improving the odor and color stability of a crude heterocyclic nitrogen base of poor stability, said base being free of tar acids, the steps comprising subjecting the base crude to preliminary distillation, thereafter mixing the crude base with aqueous caustic alkali solution, refluxing the mixture until the base in the reflux condensate is clear and colorless, and then separating the thus purified base from the spent caustic solution.

3. A process for improving the odor and color stability of a crude heterocyclic nitrogen base of poor stability, said base being free of tar acids, comprising mixing the crude base with aqueous caustic soda solution, refluxing the mixture for ½ to 5 hours, and then separating the thus purified base from the spent caustic solution.

4. A process for improving the odor and color stability of a crude heterocyclic nitrogen base of poor stability, said base being free of tar acids, comprising mixing the crude base with aqueous caustic potash solution, refluxing the mixture for ½ to 5 hours, and then separating the thus purified base from the spent caustic solution.

5. In a process for improving the odor and color stability of a crude heterocyclic nitrogen base of undesirable odor and poor color stability, said base being free of tar acids, comprising subjecting the base crude to preliminary distillation to remove residual tar, mixing the crude base with aqueous caustic alkali solution, refluxing the mixture for ½ to 5 hours, settling and then separating the spent caustic solution, dehydrating and distilling the thus purified nitrogen base.

6. In a process for improving the odor and color stability of a crude pyridine free of tar acids and made by high temperature carbonization of coal, the steps which comprise mixing the crude base with aqueous caustic alkali solution, refluxing the mixture, separating the nitrogen base from the spent caustic solution, dehydrating and fractionally distilling the thus purified nitrogen base to recover a pyridine fraction of good odor and improved color stability.

7. In a process for improving the odor and color stability of a crude picoline free of tar acids and made by high temperature carbonization of coal, the steps which comprise mixing the crude base with aqueous caustic alkali solution, refluxing the mixture, separating the nitrogen base from the spent caustic solution, dehydrating and fractionally distilling the thus purified nitrogen base to recover a picoline fraction of good odor and improved color stability.

JOHN WESLEY WALDRON.

REFERENCES CITED

The following references are of record in the file of this patent:

UNITED STATES PATENTS

| Number | Name | Date |
|---|---|---|
| 1,339,310 | Wirth | May 4, 1920 |
| 1,445,668 | Derby | Feb. 20, 1923 |
| 1,572,552 | Michelman | Feb. 9, 1926 |
| 1,686,136 | Ihrig | Oct. 2, 1928 |
| 1,861,357 | Perilhou | May 31, 1932 |
| 2,216,968 | Vesterdal | Oct. 8, 1940 |
| 2,266,359 | Edwards et al. | Dec. 16, 1941 |
| 2,302,600 | Cislak | Nov. 17, 1942 |

FOREIGN PATENTS

| Number | Country | Date |
|---|---|---|
| 125,445 | Great Britain | Apr. 24, 1919 |

OTHER REFERENCES

Chem. Engineers Handbook, 2nd edition; page 1401; J. H. Perry, editor (McGraw-Hill Book Co. 1941).